US012808249B2

(12) United States Patent
Miura et al.

(10) Patent No.: US 12,808,249 B2
(45) Date of Patent: Nov. 24, 2026

(54) INFORMATION PROCESSING APPARATUS, VEHICLE, AND METHOD

(71) Applicant: TOYOTA JIDOSHA KABUSHIKI KAISHA, Toyota (JP)

(72) Inventors: Mitsuhiro Miura, Toyota (JP); Yoshiaki Tomatsu, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 19/018,030

(22) Filed: Jan. 13, 2025

(65) Prior Publication Data

US 2025/0257599 A1 Aug. 14, 2025

(30) Foreign Application Priority Data

Feb. 14, 2024 (JP) ................................ 2024-020451

(51) Int. Cl.
*E05F 15/40* (2015.01)
*B60Q 9/00* (2006.01)
*G06V 20/58* (2022.01)

(52) U.S. Cl.
CPC ................ *E05F 15/40* (2015.01); *B60Q 9/00* (2013.01); *G06V 20/58* (2022.01); (Continued)

(58) Field of Classification Search
CPC ...... E05F 15/40; E05F 2015/767; B60Q 9/00; B60Q 9/008; G06V 20/58; E05Y 2400/36; E05Y 2900/506; E05Y 2900/531
See application file for complete search history.

(56) References Cited

U.S. PATENT DOCUMENTS 5,963,000 A * 10/1999 Tsutsumi ................ E05F 15/43 250/221
11,683,454 B2 * 6/2023 Takahashi ............ G06V 20/593 348/148
(Continued)

FOREIGN PATENT DOCUMENTS

JP 2009035375 A * 2/2009
JP 2009-107527 A 5/2009
(Continued)

*Primary Examiner* — Nay Tun
(74) *Attorney, Agent, or Firm* — Dinsmore & Shohl LLP

(57) ABSTRACT

A controller comprising at least one processor of an information processing apparatus acquires a parameter value related to penetration of light from outside a vehicle into a predetermined area set inside than the vehicle's door, which is a target of a detection process for analyzing moving images of obstacles to the door's opening/closing in the predetermined area. The controller executes a determination process to decide whether the parameter value meets a predetermined condition, which are expected to increase false detections in the detection process due to light penetration into the predetermined area. The controller executes the detection process when the parameter value is considered not to meet the predetermined the condition. When the parameter value is considered to meet the predetermined condition, the controller prohibits the execution of the detection process, and output notification information regarding the prohibition of the detection process to the vehicle's driver.

9 Claims, 6 Drawing Sheets

(52) U.S. Cl.
CPC ..... *E05Y 2400/36* (2013.01); *E05Y 2900/506* (2013.01); *E05Y 2900/531* (2013.01)

(56) References Cited

U.S. PATENT DOCUMENTS

| | | | | |
|---|---|---|---|---|
| 2009/0108987 | A1* | 4/2009 | Shikai | B66B 13/26 340/3.1 |
| 2013/0125468 | A1* | 5/2013 | El Fassi | E05F 15/40 49/506 |
| 2019/0370609 | A1* | 12/2019 | Akiyama | G06V 10/454 |
| 2020/0346602 | A1* | 11/2020 | Yokoi | B60R 21/01538 |
| 2023/0319397 | A1* | 10/2023 | Ishikawa | H04N 23/651 348/333.13 |
| 2023/0373504 | A1* | 11/2023 | Diamond | B60W 50/14 |

FOREIGN PATENT DOCUMENTS

| | | | |
|---|---|---|---|
| JP | 2010030371 | A * | 2/2010 |
| JP | 2021-149541 | A | 9/2021 |
| JP | 2022-094724 | A | 6/2022 |
| JP | 2023-142945 | A | 10/2023 |

* cited by examiner

SUN INFORMATION

| POSITION | TIME | SOLAR ALTITUDE | SOLAR DIRECTION |
| --- | --- | --- | --- |
| *** | *** | *** | *** |
| | ⋮ | ⋮ | ⋮ |
| | *** | *** | *** |
| ⋮ | ⋮ | ⋮ | ⋮ |

FIG. 4

CONDITION INFORMATION

| CONDITION ID | RELATIVE ALTITUDE | RELATIVE AZIMUTH |
|---|---|---|
| *** | *** | *** |
| ⋮ | ⋮ | ⋮ |
| *** | *** | *** |

FIG. 5

INFORMATION PROCESSING APPARATUS, VEHICLE, AND METHOD

CROSS REFERENCE TO THE RELATED APPLICATION

This application claims the benefit of Japanese Patent Application No. 2024-020451, filed on Feb. 14, 2024, which is hereby incorporated by reference herein in its entirety.

BACKGROUND

Technical Field

This disclosure relates to an information processing device, a vehicle, and a method.

Description of the Related Art

Japanese Patent Application Laid-Open No. 2022-94724 discloses a monitoring system. In the monitoring system, photographic images taken by a photographing unit that photographs the cabins of multiple moving bodies are obtained. In the monitoring system, based on the obtained photographic images, the amount of movement of passengers present in each cabin of the multiple moving bodies is acquired. In the monitoring system, based on the acquired amount of movement, the priority indicating the necessity to monitor the passengers is calculated. In the monitoring system, the target to be displayed on a display device that sequentially switches and displays each cabin of the multiple moving bodies at the display switching time is determined based on the priority.

SUMMARY

This disclosure aims to improve the detection accuracy of objects that hinder the opening and closing of vehicle doors through moving image analysis, while reducing the monitoring burden on the vehicle driver regarding such objects.

An information processing apparatus, according to the present disclosure, includes a controller comprising at least one processor configured to perform:

- acquiring a parameter value related to penetration of light from outside a vehicle into a predetermined area set inside than the vehicle's door, which is a target of a detection process for analyzing moving images of obstacles to the door's opening/closing in the predetermined area;
- executing a determination process to decide whether the parameter value meets a predetermined condition, which are expected to increase false detections in the detection process due to light penetration into the predetermined area;
- executing the detection process if the parameter value is considered not to meet the predetermined the condition;
- if the parameter value is considered to meet the predetermined condition;
  - prohibiting the execution of the detection process, and
  - outputting notification information regarding the prohibition of the detection process to the vehicle's driver.

With this disclosure, it becomes possible to improve the detection accuracy of objects that hinder the opening and closing of vehicle doors through moving image analysis, while reducing the monitoring burden on the vehicle driver regarding such objects.

BRIEF DESCRIPTION OF THE DRAWINGS

FIG. 4 shows an example of a table structure of sun information held in the sun information database, FIG. 5 is a diagram showing an example of the table structure of condition information stored in the condition information database.

DESCRIPTION OF THE EMBODIMENTS

Figure 1:
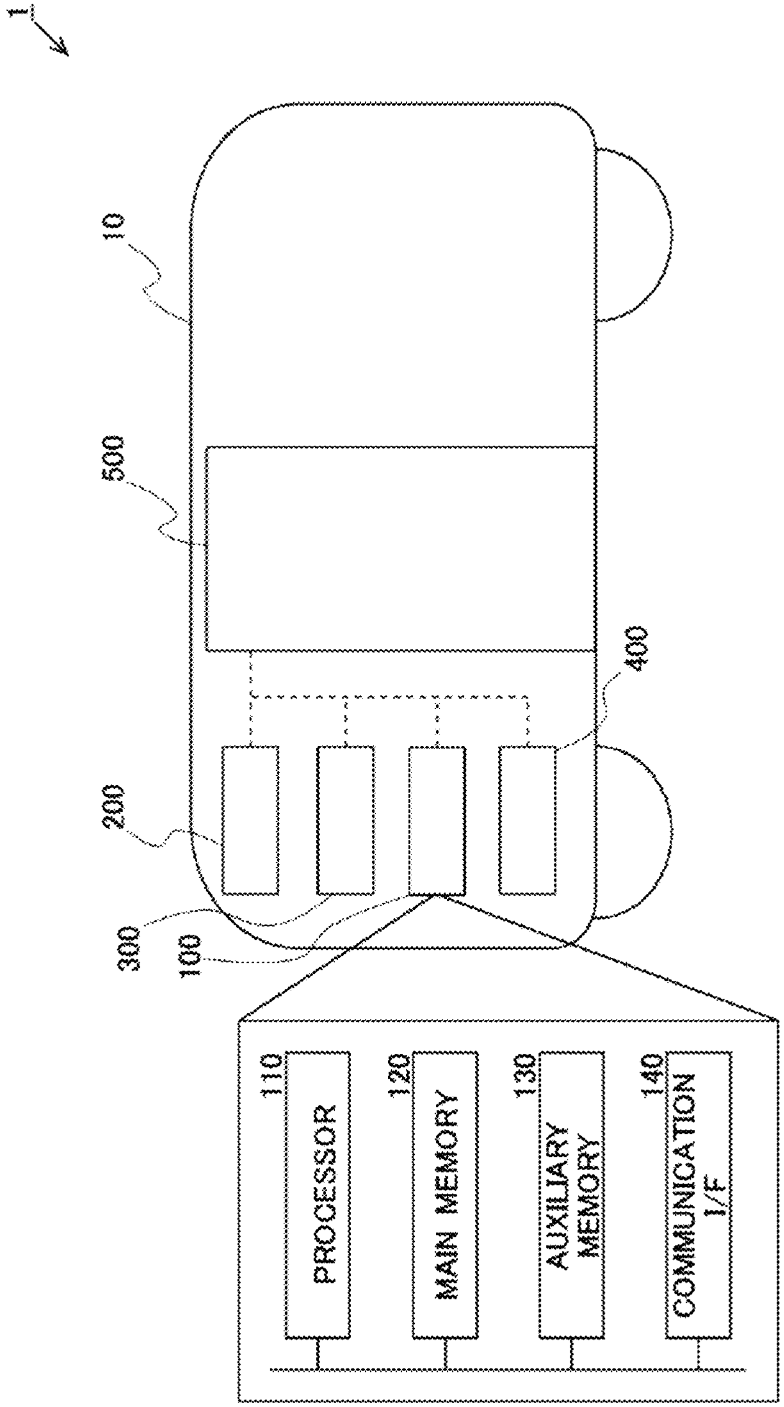
FIG. 1 is a diagram illustrating the schematic configuration of the monitoring system.

In a vehicle, if an object (person or item) is present near the door, the object may obstruct the door's opening and closing. Therefore, the presence of an object near the door is determined by analyzing moving images captured by a camera installed in the vehicle. On the other hand, there may be cases where light shines near the door. At this time, it is possible that the light inserting into the area may be mistakenly recognized as an object in the moving image analysis. This results in a false determination that an object obstructing the door's opening and closing is present near the door.

Accordingly, the controller, comprising at least one processor, of the information processing apparatus related to this disclosure acquires a parameter value related to the insertion of light from outside the vehicle into the predetermined area. Here, the predetermined area is an area set inside than the vehicle door and is an area subject to detection process by analyzing the moving image analysis of objects that may obstruct the opening and closing of the door. The controller of the information processing apparatus executes the determination process to determine whether the parameter value meets the predefined condition suggestive of an increased detection process of misdetection due to light intrusion into the predetermined area.

If the controller determines that the parameter value does not meet the predefined condition, it executes the detection process. Conversely, if the parameter value meets the predefined condition, the controller prohibits the execution of the detection process. If the detection process is prohibited, the controller outputs to the driver notification information regarding the prohibition of executing the detection process.

Thus, as explained earlier, the information processing device determines the feasibility of executing the detection process according to the parameter value. If there is no expected increase (i.e., low possibility) in misdetection for detection process based on light intrusion into the prescribed area, the information processing device executes the detection process. If an increase (i.e., high possibility) in detection process is expected, the device prohibits the detection process.

Also, if the execution of the detection process is prohibited, the information processing device notifies the driver regarding the detection process. This ensures the driver becomes aware that the detection process is not executed and urges them to check for the presence of objects in the predetermined area. In other words, when the possibility of a false detection in the detection process is low, the presence or absence of an object in the predetermined area is confirmed through the detection process. When the possibility of a false detection in the detection process is high, the driver of the vehicle is prompted to confirm the presence or absence of an object in the predetermined area. Thus, it becomes possible to improve detection accuracy of objects that hinder the opening and closing of vehicle doors through moving image analysis, while reducing the monitoring burden on the vehicle driver regarding such objects.

The specific embodiments of this disclosure will be described below with reference to the drawings. Unless specifically mentioned, the dimensions, materials, shapes, and relative arrangements of the components described in the embodiment do not intend to limit the technical scope of this disclosure to those alone. Additionally, unless specifically mentioned, the hardware configuration, module configuration, and functional configuration described in the embodiment do not intend to limit the technical scope of the disclosure to those alone.

Embodiment (System Outline)

The monitoring system 1 in the embodiment will be described with reference to FIGS. 1 and 2. FIG. 1 is a diagram showing an outline configuration of the monitoring system 1. The monitoring system 1 is configured to include the in-vehicle device 100, the illuminance sensor 200, the camera 300, the GPS sensor 400, and the door 500. Here, the in-vehicle device 100, the illuminance sensor 200, the camera 300, the GPS sensor 400, and the door 500 are mounted on the vehicle 10. In the monitoring system 1, the in-vehicle device 100, the illuminance sensor 200, the camera 300, the GPS sensor 400, and the door 500 are connected via an in-vehicle network. In this embodiment, the vehicle 10 is a bus. However, the vehicle 10 can be a vehicle other than a bus. As an example of a vehicle 10 other than a bus, a train car can be mentioned.

Figure 2:
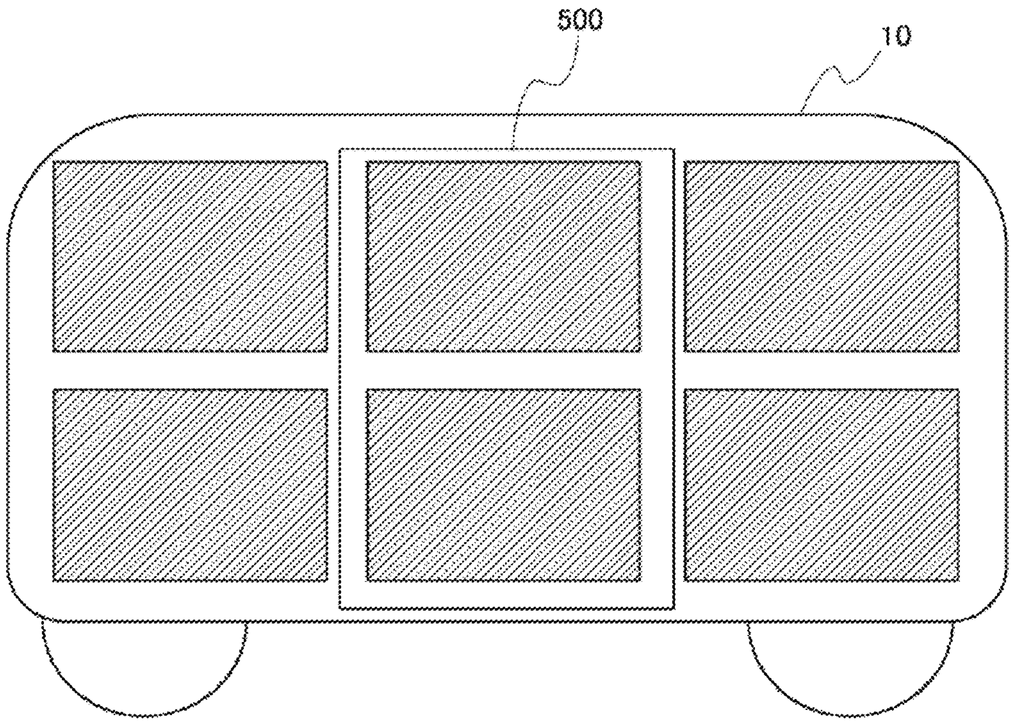
FIG. 2 is an example of the window arrangement on the side of a vehicle.

FIG. 2 is an example of the arrangement of windows on the side of vehicle 10. As shown in FIG. 2, windows (cross-hatched sections in FIG. 2) are provided on the side of the vehicle 10. Three windows are provided on the upper part of vehicle 10 and three windows on the lower part of vehicle 10's side for reasons such as making it easy to gather light and ensuring visibility outside vehicle 10. Windows are also provided on the upper and lower parts of door 500. Further, windows may also be provided on the front or rear of the vehicle 10, at the upper and lower parts of the vehicle.

(Illuminance Sensor)

The illuminance sensor 200 is a sensor installed in vehicle 10. The illuminance sensor 200 senses the illuminance outside the vehicle 10. The illuminance sensor 200 transmits in real-time the measured illuminance outside vehicle 10 to the in-vehicle device 100 via the in-vehicle network.

(GPS Sensor)

The GPS sensor 400 is a GPS sensor installed in vehicle 10. The GPS sensor 400 senses the current position of the vehicle 10 and the orientation of the vehicle 10 (hereinafter sometimes referred to as "vehicle orientation"). The GPS sensor 400 transmits the sensed current position and vehicle orientation of the vehicle 10 to the in-vehicle device 100 in real-time via the in-vehicle network.

(Camera)

The camera 300 is a camera installed inside vehicle 10. The camera 300 captures moving images within vehicle 10, including around door 500. The camera 300 transmits in real-time the captured moving images to the on-board in-vehicle device 100 via the in-vehicle network.

(Door)

The door 500 is a door provided for boarding and alighting the vehicle 10. The door 500 receives opening or opening/closing information from in-vehicle device 100 via the in-vehicle network, instructing the opening or closing of the door 500. The door 500 opens or closes in accordance with the received opening or opening/closing information.

(In-Vehicle Device)

The in-vehicle device 100 is a device mounted on the vehicle 10. The in-vehicle device 100 has a function to manage the opening and closing of door 500. Here, there may be objects present in the predetermined area. The predetermined area is set to be inside door 500 and is an area where an object may hinder the opening and closing of door 500 if present. The predetermined area could be, for example, a step portion of the vehicle 10. In addition, the predetermined area may be an area within a predetermined distance from the door 500 or an area defined by a predetermined range, for example. Moreover, the object detected by the in-vehicle device 100 through moving image analysis includes objects such as humans, goods, and animals.

In this case, objects present in the predetermined area can hinder door 500's opening and closing. Specifically, an object presents in the predetermined area when door 500 is open can get caught in the door pocket, hindering the door 500's opening and closing. Also, an object that is present in the predetermined area when door 500 is closing may obstruct the opening and closing of door 500 if it gets caught in the door. Therefore, the in-vehicle device 100 executes a process (hereinafter sometimes referred to as "detection process") to determine whether an object exists in the predetermined area within the vehicle 10 by analyzing the moving images captured by the camera 300.

Then, the in-vehicle device 100 permits the opening and closing of door 500 if, in the detection process, it determines that no object exists in the predetermined area. Conversely, the in-vehicle device 100 prohibits the opening and closing of door 500 if it determines that an object exists in the predetermined area during the detection process.

On the other hand, depending on the current position and vehicle orientation of the vehicle 10, light may shine into the vehicle 10. However, there is a possibility that the in-vehicle device 100 may mistakenly recognize light entering the specific area as an object during the moving image analysis. Therefore, there may be cases where, due to light shining into the predetermined area, the in-vehicle device 100 falsely detects that an object is present in the predetermined area during the detection process, even though there is no object present in the predetermined area.

Furthermore, as mentioned above, in order to make it easier to let in light and to ensure visibility outside the vehicle 10, windows are installed below the central part as well. As a result, light is likely to enter the predetermined area through the window provided below the vehicle 10. Particularly, in vehicle 10, a window is also provided at the lower part of the door 500, and light passing through this window is likely to enter the predetermined area. In other words, the window installed below the vehicle 10 for daylighting and improving the view tends to hinder the accuracy of the detection process.

Therefore, the in-vehicle device 100 acquires parameter values (hereinafter sometimes simply referred to as "parameter values") related to the light entering the predetermined area. In this embodiment, the parameter values include the current position and vehicle orientation of the vehicle 10 obtained by the GPS sensor 400. Additionally, the parameter value includes the position of the sun. The parameter values also include the position of the sun and the illuminance outside vehicle 10 acquired by the illuminance sensor 200. The in-vehicle device 100 determines whether or not to execute the detection process based on these parameter values. Details on how the in-vehicle device 100 determines whether or not to execute the detection process according to the parameter value will be described later.

Also, if the in-vehicle device 100 prohibits the execution of the detection process, it outputs notification information (voice output or display output). The notification information is meant to inform the driver of the vehicle 10 that the execution of the detection process is prohibited.

The in-vehicle device 100 includes a computer having a processor 110, main memory 120, auxiliary memory 130, and a communication interface (communication I/F) 140. The processor 110 is, for example, a CPU (Central Processing Unit) or DSP (Digital Signal Processor). The main memory 120 is, for example, RAM (Random Access Memory). The auxiliary memory 130 is, for instance, ROM (Read Only Memory). The auxiliary memory 130 can be, for example, a HDD (Hard Disk Drive), CD-ROM, DVD disc, or Blu-ray disc. Additionally, the auxiliary memory 130 may be a removable medium (portable storage medium). Examples of such removable media include a USB memory or an SD card. The communication I/F 140 is, for instance, a LAN (Local Area Network) interface board or a wireless communication circuit for wireless communication.

In the in-vehicle device 100, various programs and information tables are stored in the auxiliary memory 130 along with the operating system (OS). Furthermore, in the in-vehicle device 100, the processor 110 realizes various functionalities, as described below, by loading and executing programs stored in the auxiliary memory 130 to the main memory 120. However, some or all of the functions in the in-vehicle device 100 may be implemented by a hardware circuit such as an ASIC or FPGA. The in-vehicle device 100 does not necessarily need to be realized by a single physical configuration, but may be composed of multiple computers that cooperate with each other. Additionally, the illuminance sensor 200, camera 300, GPS sensor 400, and door 500, like the in-vehicle device 100, can also be configured to include computers.

(Function Configuration)

Figure 3:
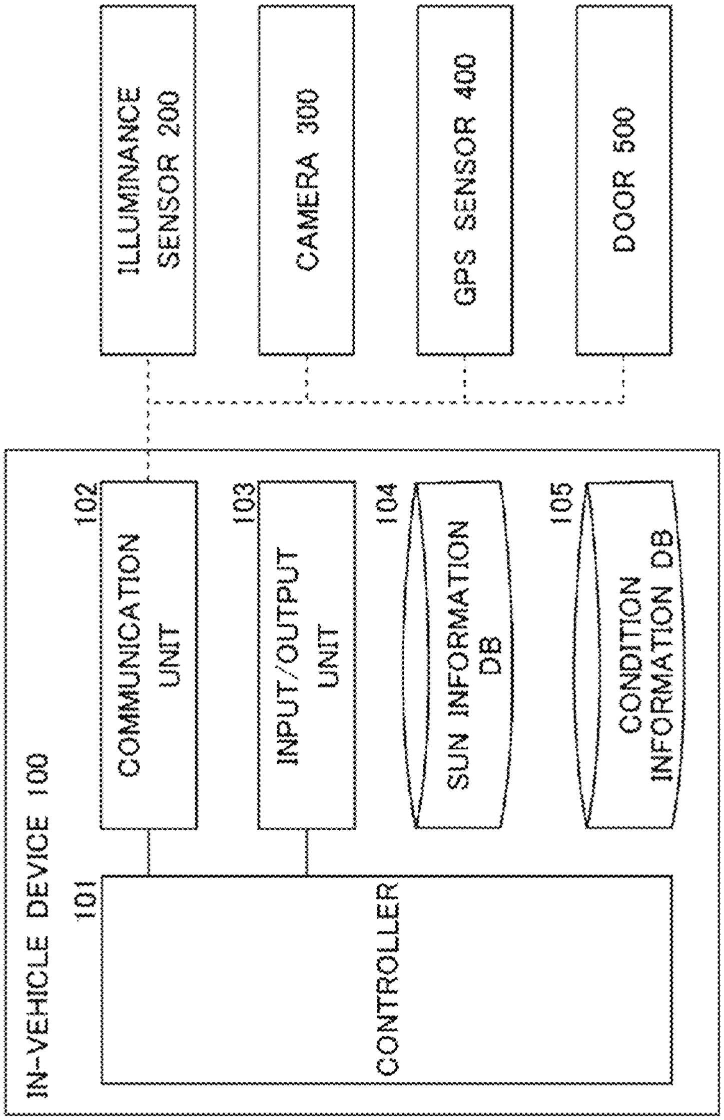
FIG. 3 is a block diagram schematically illustrating an example of the functional configuration of the in-vehicle device.

Next, the functional configuration of the in-vehicle device 100 constituting the monitoring system 1 will be described with reference to FIGS. 3 to 5. FIG. 3 is a block diagram schematically showing an example of the functional configuration of the in-vehicle device 100. The in-vehicle device 100 includes a controller 101, a communication unit 102, an input/output unit 103, a sun information database 104 (sun information DB 104), and a condition information database 105 (condition information DB 105).

The controller 101 has a function of performing arithmetic processing for controlling the in-vehicle device 100. The controller 101 can be realized by a processor 110 in the in-vehicle device 100. The communication unit 102 has a function of connecting the in-vehicle device 100 to an in-vehicle network. The communication unit 102 can be realized by a communication I/F 140 in the in-vehicle device 100.

The input/output unit 103 has a function for the driver of the vehicle 10 to input various information into the in-vehicle device 100. In addition, the input/output unit 103 has a function to output various information (display on the display, and sound output) to the driver of the vehicle 10. The input/output unit 103 can be realized by the touch panel and the speaker in the in-vehicle device 100.

The sun information DB 104 has the function of storing sun information. The sun information DB 104 can be realized by an auxiliary memory 130 in the in-vehicle device 100. Sun information is information for identifying the position of the sun. FIG. 4 is a diagram showing an example of the table structure of sun information held in the sun information DB 104.

As shown in FIG. 4, the sun information includes a position field, a time field, a solar altitude field, and a solar direction field. Here, the position field stores the position of each location. For example, the latitude and longitude of each location are stored in the position field. The time field stores each time. The time field stores information indicating each time between sunrise and sunset.

The solar altitude field stores the solar altitude at the position of the corresponding position field at the time of the corresponding time field. The solar altitude is an angle set considering the horizon direction as 0 degrees, and the zenith as 90 degrees. In addition, the solar azimuth field stores the azimuth (solar azimuth) where the solar exists at the time of the corresponding time field when viewed from the position of the corresponding position field. The controller 101 can grasp the position of the sun at each location at each time by acquiring the sun information held in the sun information DB 104.

The condition information DB 105 has the function of storing condition information. The condition information DB 105 can be realized by an auxiliary memory 130 in the in-vehicle device 100. The condition information is information that indicates the relative position of the sun with reference to the vehicle 10, which is estimated when light shines into a predetermined area. FIG. 5 shows an example of the table structure of the condition information stored in the condition information DB 105.

As shown in FIG. 5, the condition information includes a condition ID field, a relative altitude field, and a relative azimuth field. The condition ID field stores an identifier (condition ID) for specifying the condition of the relative position of the sun, estimated to find if light will shine into the predetermined area. The relative altitude field stores the sun's altitude relative to the vehicle 10 when light shines into a predetermined area (hereinafter sometimes referred to as "relative altitude"). The relative azimuth field stores the solar azimuth (hereinafter sometimes referred to as "relative azimuth") based on the vehicle 10 when light shines into a predetermined area.

Here, the relative altitude field stores the solar altitude as the relative altitude when light shines into the predetermined area if the vehicle 10 is present on a plane. In addition, the relative azimuth field stores the azimuth relative to the front direction of the vehicle 10 when light shines into a predetermined area. Specifically, the relative azimuth field stores the azimuth set so that the angle increases counterclockwise (or clockwise) with the front direction of the vehicle 10 being 0 degrees. Relative altitude and relative azimuth are determined, for example, by simulating whether light shines into vehicle 10 at each relative altitude and each relative azimuth.

In this way, the condition information stores the position of the sun, estimated to shine light into a predetermined area, as the relative position (relative altitude and relative azimuth) with reference to the vehicle 10. The controller 101 can ascertain the conditions (the relative position of the sun) under which light may shine into the vehicle 10 by acquiring the condition information stored in the condition information DB 105.

The controller 101 receives the current position of the vehicle 10 from the GPS sensor 400 via the communication unit 102. The controller 101 calculates the relative position of the sun using the sun information stored in the sun information DB 104, the current position of the vehicle 10, and vehicle orientation.

Specifically, the controller 101 references the sun information and identifies the position field where the position matching the current position of the vehicle 10 is stored. Also, the controller 101 identifies the time field corresponding to the identified location field and acquires the solar altitude and solar azimuth for the current time.

The controller 101 refers to the sun altitude at the current position of the vehicle 10 and calculates the relative altitude based on the vehicle 10. At this time, the road on which the vehicle 10 is driving may be inclined. Consequently, the vehicle 10 may tilt according to the road's inclination. Therefore, the controller 101 may calculate the relative altitude considering the tilt (roll angle and pitch angle) of the vehicle 10. Additionally, the controller 101 refers to the solar orientation at the current position of the vehicle 10 and calculates the direction of the sun relative to the front direction of the vehicle 10 as the relative orientation. In this way, the controller 101 calculates the relative position of the sun based on the vehicle 10.

The controller 101 refers to the condition information held in the condition information DB 105 and determines whether there are relative altitude fields and relative azimuth fields that match the calculated relative altitude and relative azimuth. If there are relative altitude fields and relative azimuth fields that match the current relative altitude and relative azimuth, the controller 101 determines that light can penetrate into the predetermined area. Conversely, if there are no relative altitude fields and relative azimuth fields that match the current relative altitude and relative azimuth, the controller 101 determines that light will not penetrate into the predetermined area. In this way, the controller 101 determines whether the current position and vehicle orientation of the vehicle 10 are at a position and orientation where light can potentially enter a predetermined area.

On the other hand, even if the current position and vehicle orientation of the vehicle 10 are at a location and orientation where light can potentially enter a predetermined area, there are cases where light does not actually enter the vehicle 10. One reason why light does not actually enter the vehicle 10 can be exemplified due to the vehicle 10 being hidden in a shadow, preventing light from sufficiently reaching it. Also, the reason light does not actually enter the vehicle 10 can be exemplified due to the influence of clouds causing light not to reach sufficiently. Therefore, the controller 101 obtains the illumination outside the vehicle 10 from the illuminance sensor 200. Then, the controller 101 determines whether the external illumination of the vehicle 10 acquired from the illuminance sensor 200 is above the threshold. Here, the threshold is a preset value that determines whether light is not sufficiently reaching or not.

Therefore, if the current position and vehicle orientation of the vehicle 10 are at a location and orientation where light can potentially enter a predetermined area, and the illuminance outside the vehicle 10 is above a threshold (hereafter sometimes referred to as "predetermined condition"), it can be estimated that light will enter the predetermined area. Therefore, the controller 101 determines that light will enter the predetermined area when the predetermined conditions are met. Conversely, the controller 101 determines that light will not enter the predetermined area when these conditions are not met.

In this way, the controller 101 determines whether light enters a predetermined area using the current position and vehicle orientation of the vehicle 10, the position of the sun, and the illuminance outside the vehicle 10 as parameter values. In other words, the controller 101 determines, based on the parameter values, whether or not an increase in erroneous detections in the detection process due to light shining into the predetermined area is expected.

Additionally, the controller 101 determines the execution of the detection process when the predetermined conditions are not met. Moreover, the controller 101 prohibits the execution of the detection process when the predetermined conditions are met.

If the execution of the detection process is determined and no object in the predetermined area is detected during the detection process, the controller 101 permits the process of opening and closing the door 500. At this time, when the input/output unit 103 receives an input instructing the opening or closing of Door 500, the controller 101 sends the opening/closing information to Door 500 via the communication unit 102.

On the other hand, if the detection process detects an object in the predetermined area, the controller 101 prohibits the execution of the door opening and closing process of the door 500. At this time, even if the input/output unit 103 receives an input instructing the opening or closing of Door 500 from the driver of vehicle 10, the controller 101 does not send opening/closing information to Door 500 via the communication unit 102. The controller 101 may notify the driver of the vehicle 10 that there is an object in front of the door 500 via the input/output unit 103.

Furthermore, if the prohibition of the detection process is determined, the controller 101 notifies the driver of the vehicle 10 that the execution of the detection process is prohibited. Specifically, the controller 101 transmits notification information that the execution of the detection process is prohibited to the input/output unit 103. The input/output unit 103 displays or announces via voice to the driver of the vehicle 10 that the execution of the detection process is prohibited according to the notification information. Thus, the driver of the vehicle 10 can recognize that the execution of the detection process is prohibited. Therefore, the driver of vehicle 10 will be prompted to visually check around the door 500. If the notification process is executed, the controller 101 presumes that the driver of vehicle 10 is visually confirming around the door 500 and permits the execution of the door 500 opening/closing process.

At this time, for example, there may be an object in the blind spot of the driver of vehicle 10, or the affirmation by the driver of vehicle 10 may be insufficient, resulting in the presence of an object in the predetermined area. Therefore, when the execution of the detection process is prohibited, the possibility of an object being present in the predetermined area is higher than when the detection process is executed. Consequently, the controller 101 sets the speed of opening and closing the door 500 to be slower when the execution of the detection process is prohibited compared to when the detection process is executed. Specifically, the controller 101 sets the speed of opening and closing the door 500 to be slower than usual when the execution of the detection process is prohibited.

Hence, the door 500 opens more slowly, which suppresses the object in the predetermined area from getting caught by the door 500 compared to when it opens quickly. Also, since the closing speed of the door 500 is slow, even if an object in the predetermined area is caught by the door 500, damage to the object can be suppressed. In this way, the door 500 can be safely opened and closed more securely in situations where an object is more likely to be present in the predetermined area than when the detection process is executed.

(Flowchart)

Figure 6:
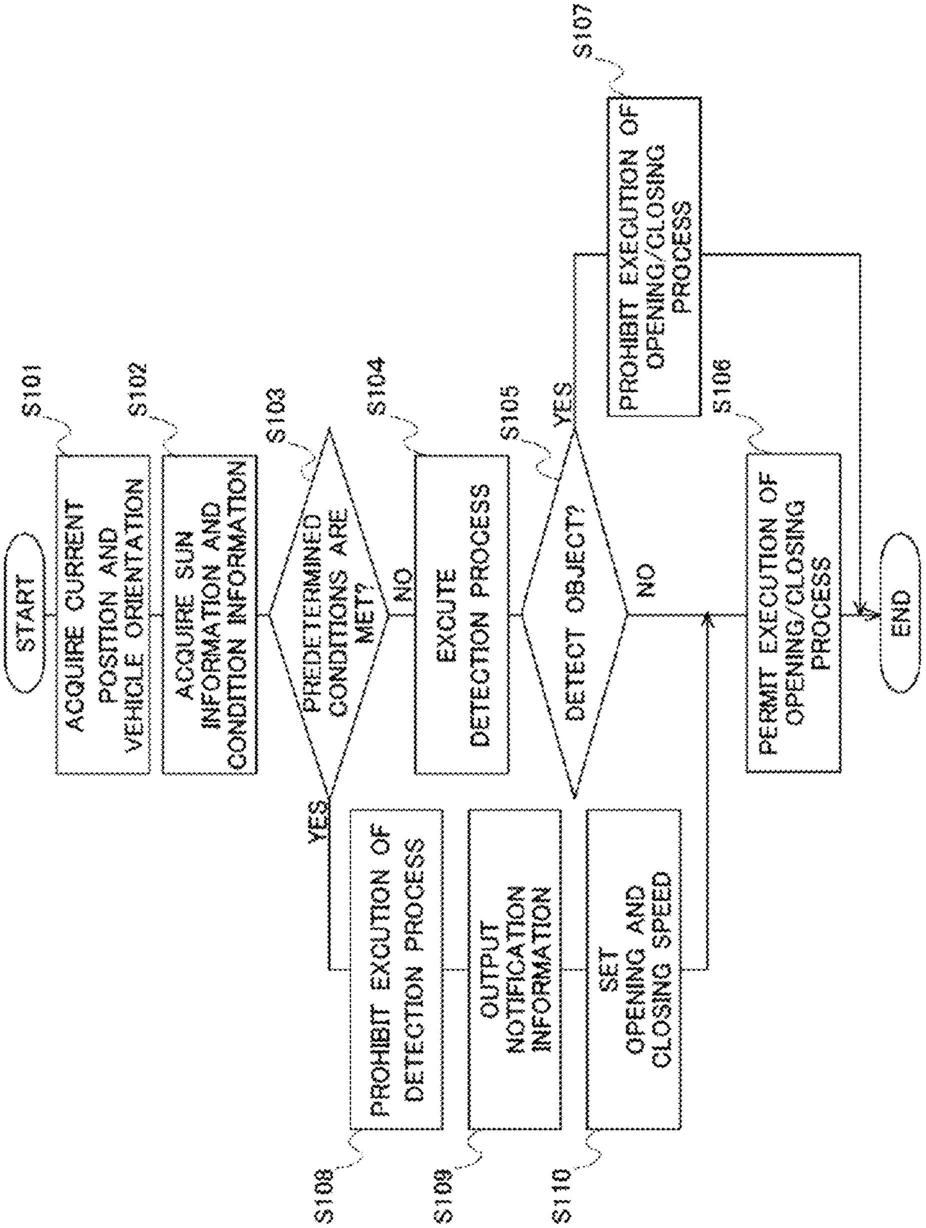
FIG. 6 is a flowchart of the processing executed by the controller.

Next, the processing executed by the controller 101 in the in-vehicle device 100 the monitoring system 1 will be described with reference to FIG. 6. FIG. 6 is a flowchart of the process executed by the controller 101. This processing is for determining the execution of the detection process and whether or not the door can be opened and closed. The processing illustrated in FIG. 6 is repeatedly executed at predetermined intervals.

First, in step S101 of the process shown in FIG. 6, the current position and vehicle orientation of the vehicle 10 are obtained from the GPS sensor 400 via the communication unit 102. Next, at S102, the sun information and condition information are acquired from the sun information DB 104 and the condition information DB 105, respectively. Next, in S103, the current position, vehicle orientation, sun information, and condition information of the vehicle 10 are referenced, and it is determined whether the predetermined conditions are met.

When a negative determination is made in S103, it is estimated that light is not entering the predetermined area. Therefore, since there is a low possibility of erroneous detection of objects in the predetermined area due to light shining into the designated area during the detection process, the detection process is executed in S104. Next, in S105, it is determined whether an object was detected in the detection process. If a negative determination is made in S105, there are no objects in the predetermined area. Then, in S106, the execution of the opening/closing process of door 500 is permitted. After that, the door 500 opening/closing process at normal speed is executed by the driver of vehicle 10 inputting an opening/closing instruction to the input/output unit 103. And the process shown in FIG. 6 is temporarily ended.

Additionally, if a positive determination is made in S105, there are objects in the predetermined area. Then, in S107, the execution of the opening/closing process is prohibited. Then the process shown in FIG. 6 is temporarily ended. In this case, the process shown in FIG. 6 will be executed again. When re-executing the process shown in FIG. 6, if in S105 it is determined that the object is no longer detected in the predetermined area due to the movement of the object, the execution of the opening/closing process is permitted.

When an affirmative determination is made in S103, it is presumed that light is shining into the predetermined area. Therefore, in S108, the execution of the detection process is prohibited. Additionally, in S109, notification information is output through input/output unit 103. Additionally, in S110, the opening and closing speed is set to be slower than usual. Then, in S106, the opening and closing operation of the door 500 at the set opening and closing speed is permitted. After that, the driver of the vehicle 10 inputs a command to open or close the door to the input/output unit 103, and the door 500 opens and closes at the set opening and closing speed. Then, the process shown in FIG. 6 is temporarily terminated.

As explained above, in the monitoring system 1, the current position of the vehicle 10, the direction of the vehicle, the brightness outside the vehicle 10, and the sun information determine whether the detection process will be executed. If the detection process is executed in monitoring system 1, according to the detection or non-detection of objects within a predetermined area by the detection process, the execution of the door 500 opening/closing process is determined.

Furthermore, when the execution of the detection process is prohibited in the monitoring system 1, a notification information is output without executing the detection process. This encourages the driver of vehicle 10 to verify by themselves whether there are objects around door 500 instead of relying on the detection process. Then, in a state where the driver of the vehicle 10 is prompted to confirm whether there are objects around the door 500, it is possible to open and close the door 500.

In this way, when the possibility of false detection in the detection process is low, the presence or absence of an object in a predetermined area is confirmed by the detection process, and when the possibility of false detection in the detection process is high, the driver of the vehicle 10 is prompted to confirm the presence or absence of an object in the predetermined area. When the possibility of false detection in the detection process is high, the driver of vehicle 10 is prompted to confirm the presence or absence of objects in the predetermined area.

Modification Example 1

In this embodiment, the predetermined conditions are that the current position and vehicle orientation of the vehicle 10 are such that sunlight might enter a predetermined area, and the illuminance outside the vehicle 10 is above the threshold. However, the predetermined conditions do not necessarily have to be as described above.

When the solar altitude is below the predetermined height, light tends to penetrate through the window and shine into the vehicle 10, making it likely for light to also shine into the predetermined area. Therefore, the predetermined condition can also be that the sun's altitude is below a predetermined height at the current time. In other words, the parameter value in this case is the solar altitude.

Additionally, there are time periods when the sun's altitude is below a predetermined height. Therefore, the specified condition may be a predetermined time period during which the solar altitude is lower than a predetermined altitude. In other words, the parameter value in this case is the current time. Since the sun's altitude varies according to the season, the predetermined time periods must be set in advance according to the season or other factors.

Furthermore, the predetermined condition may not include the requirement that the illumination outside the vehicle 10 is above a threshold. In other words, the predetermined condition can also be interpreted as the current position and vehicle orientation of the vehicle 10 being at a location and orientation where light can potentially enter a predetermined area. In this way, while improving the detection accuracy of the detection process, it is possible to reduce the monitoring burden on the driver of vehicle 10.

Modification Example 2

The monitoring system 1 can be used in various situations. The monitoring system 1 can be used to provide Mobility as a Service (MaaS) utilizing mobility.

OTHER EMBODIMENTS

The above-described embodiments are merely examples, and the present disclosure can be appropriately modified and implemented within the scope and spirit of the present disclosure. Moreover, the processes and elements described in the present disclosure can be freely combined and implemented as long as no technical contradiction arises.

Moreover, the processes described as being performed by one device can be shared and executed by multiple devices. Alternatively, the processes described as being performed by different devices can be executed by one device. In a computer system, how each function is realized by which hardware configuration (server configuration) can be changed flexibly.

This disclosure can also be realized by supplying a computer program that implements the functions described in the above embodiments to a computer, and one or more processors of the computer reading and executing the program. Such computer programs may be provided to the computer by a non-volatile computer-readable storage medium connectable to the computer system bus, or may be provided to the computer via a network. The non-volatile computer-readable storage medium includes, for example, any type of disk, such as a magnetic disk (floppy (registered trademark) disk or hard disk drive (HDD)), an optical disk (such as a CD-ROM, a DVD disk, or Blu-ray disk, etc.), read-only memory (ROM), random access memory (RAM), EPROM, EEPROM, magnetic cards, flash memory, or any type of medium suitable for storing electronic instructions like optical cards.

What is claimed is:

1. An information processing apparatus including a controller comprising:

at least one processor configured to perform:

acquiring a parameter value related to penetration of light from the sun into a predetermined area set inside than a vehicle's door, which is a target of a detection process for analyzing moving images of obstacles to the door's opening/closing in the predetermined area;

executing a determination process to decide whether the parameter value meets a predetermined condition, which are expected to increase false detections in the detection process due to the light penetration into the predetermined area;

executing the detection process when the parameter value is considered not to meet the predetermined condition;

when the parameter value is considered to meet the predetermined condition:

prohibiting the execution of the detection process, and outputting notification information regarding the prohibition of the detection process to a driver of the vehicle;

setting a door's opening/closing speed to be slower when the parameter value is considered to meet the predetermined condition than when the parameter value is considered not to meet the predetermined condition; and executing the door's opening/closing process at the set speed.

2. The information processing apparatus according to claim 1, wherein the parameter value includes a position of the vehicle, a direction of the vehicle, and a position of the sun, and executing the determination process includes determining whether values of the position of the vehicle, the direction of the vehicle, and the position of the sun meet the predetermined condition.

3. The information processing apparatus according to claim 2, wherein the parameter value further includes an illuminance related to the penetration of the light from the sun, and executing the determination process incudes deciding whether values of the illuminance, the position of the vehicle, the direction of the vehicle, and the position of the sun meet the predetermined condition.

4. The information processing apparatus according to claim 3, wherein the at least one processor is further configured to perform estimating that the light will enter the predetermined area in response to a current position and a vehicle orientation of the vehicle being at a location and an orientation where the light can enter the predetermined area, and the illuminance is above a threshold.

5. The information processing apparatus according to claim 2, wherein the at least one processor is further configured to perform re-executing the door's opening/closing process in response to determining that an object is no longer detected in the predetermined area due to movement of the object.

6. The information processing apparatus according to claim 5, wherein the at least one processor is further configured to perform prompting the driver of the vehicle to confirm a presence or an absence of the object in the predetermined area in response to a possibility of false detection being above a predetermined threshold.

7. The information processing apparatus according to claim 2, wherein the at least one processor is further configured to perform determining whether the detection process is executed based on a brightness outside the vehicle.

8. The vehicle using the information processing apparatus according to claim 1, wherein in the vehicle, a window is provided below a central part.

9. A method, by the at least one processor of the information processing apparatus according to claim 1, for improving travel mobility as a service (MaaS).

* * * * *